(12) United States Patent
Takahashi et al.

(10) Patent No.: US 10,683,437 B2
(45) Date of Patent: Jun. 16, 2020

(54) POLISHING AGENT FOR SYNTHETIC QUARTZ GLASS SUBSTRATE AND METHOD FOR POLISHING SYNTHETIC QUARTZ GLASS SUBSTRATE

(71) Applicant: SHIN-ETSU CHEMICAL CO., LTD., Tokyo (JP)

(72) Inventors: Mitsuhito Takahashi, Annaka (JP); Yoshihiro Nojima, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 128 days.

(21) Appl. No.: 15/562,138

(22) PCT Filed: Mar. 31, 2016

(86) PCT No.: PCT/JP2016/001866
§ 371 (c)(1),
(2) Date: Sep. 27, 2017

(87) PCT Pub. No.: WO2016/181600
PCT Pub. Date: Nov. 17, 2016

(65) Prior Publication Data
US 2018/0079930 A1 Mar. 22, 2018

(30) Foreign Application Priority Data

May 8, 2015 (JP) ................................. 2015-095657

(51) Int. Cl.
*B24B 37/04* (2012.01)
*C09G 1/02* (2006.01)
(Continued)

(52) U.S. Cl.
CPC ................ *C09G 1/02* (2013.01); *B24B 37/00* (2013.01); *B24B 37/044* (2013.01); *C09K 3/1463* (2013.01); *G11B 5/84* (2013.01)

(58) Field of Classification Search
CPC ......... B24B 37/04; B24B 37/044; C09G 1/02; C09K 3/14; C09K 3/1463
(Continued)

(56) References Cited

U.S. PATENT DOCUMENTS 6,454,821 B1   9/2002  Abbasi et al.
2004/0035153 A1  2/2004  Koike et al.
(Continued)

FOREIGN PATENT DOCUMENTS

CN      1329118 A    1/2002
CN    101153205 A    4/2008
(Continued)

OTHER PUBLICATIONS

May 22, 2018 Office Action issued in Japanese Patent Application No. 2015-095657.
(Continued)

*Primary Examiner* — George B Nguyen
(74) *Attorney, Agent, or Firm* — Oliff PLC

(57) ABSTRACT

The present invention is a polishing agent for a synthetic quartz glass substrate, containing polishing abrasive grains, a polishing accelerator, and water, wherein the polishing abrasive grains are wet ceria particles, and the polishing accelerator is a polyphosphoric acid, a salt thereof, a metaphosphoric acid, a salt thereof, a tungstic acid, or a salt thereof. There can be provided a polishing agent for a synthetic quartz glass substrate that has high polishing rate and can sufficiently reduce generation of defects due to polishing.

14 Claims, 1 Drawing Sheet

(51) Int. Cl.
*G11B 5/84* (2006.01)
*B24B 37/00* (2012.01)
*C09K 3/14* (2006.01)

(58) Field of Classification Search
USPC .................. 451/37, 41; 252/79.1, 79.2, 79.5
See application file for complete search history.

(56) References Cited

U.S. PATENT DOCUMENTS

| | | |
|---|---|---|
| 2008/0311487 A1 | 12/2008 | Ito et al. |
| 2010/0044625 A1 | 2/2010 | Nho et al. |
| 2010/0243950 A1 | 9/2010 | Harada et al. |
| 2013/0200038 A1 | 8/2013 | Li et al. |
| 2013/0244433 A1 | 9/2013 | Reiss et al. |
| 2013/0260558 A1 | 10/2013 | Oota et al. |
| 2015/0072522 A1 | 3/2015 | Jung |

FOREIGN PATENT DOCUMENTS

| | | |
|---|---|---|
| CN | 101541912 A | 9/2009 |
| CN | 101821058 A | 9/2010 |
| CN | 102559056 A | 7/2012 |
| CN | 103097476 A | 5/2013 |
| CN | 103155112 A | 6/2013 |
| CN | 104284960 A | 1/2015 |
| CN | 104559925 A | 4/2015 |
| GB | 2421955 A | 7/2006 |
| JP | 2000034470 A | 2/2000 |
| JP | 2004-98278 A | 4/2004 |
| JP | 2004-162062 A | 6/2004 |
| JP | 2005-336400 A | 12/2005 |
| JP | 2006-167817 A | 6/2006 |
| JP | 2007-213020 A | 8/2007 |
| JP | 2010-510157 A | 4/2010 |
| JP | 2013-541609 A | 11/2013 |
| JP | 2015-54967 A | 3/2015 |
| JP | 2015084432 A | 4/2015 |
| TW | 201042018 A | 12/2010 |
| WO | 2007018376 A1 | 2/2007 |
| WO | 2008040183 A1 | 4/2008 |
| WO | 2010098278 A1 | 9/2010 |
| WO | 2013138558 A1 | 9/2013 |

OTHER PUBLICATIONS

Nov. 14, 2017 International Preliminary Report on Patentability issued in International Patent Application No. PCT/JP2016/001866.
Jun. 28, 2016 International Search Report issued in International Patent Application No. PCT/JP2016/001866.
Wang Qi et al., "Application of Particle Controllable Dispersion Technology on CeO2 Polishing Powder Production", Journal of the Chinese Society of Rare Earth, vol. 29, Issue 06, pp. 724-729.
Apr. 29, 2019 Office Action issued in Chinese Patent Application No. 201680026694.3.
Oct. 8, 2019 Office Action issued in Chinese Patent Application No. 201680026694.3.

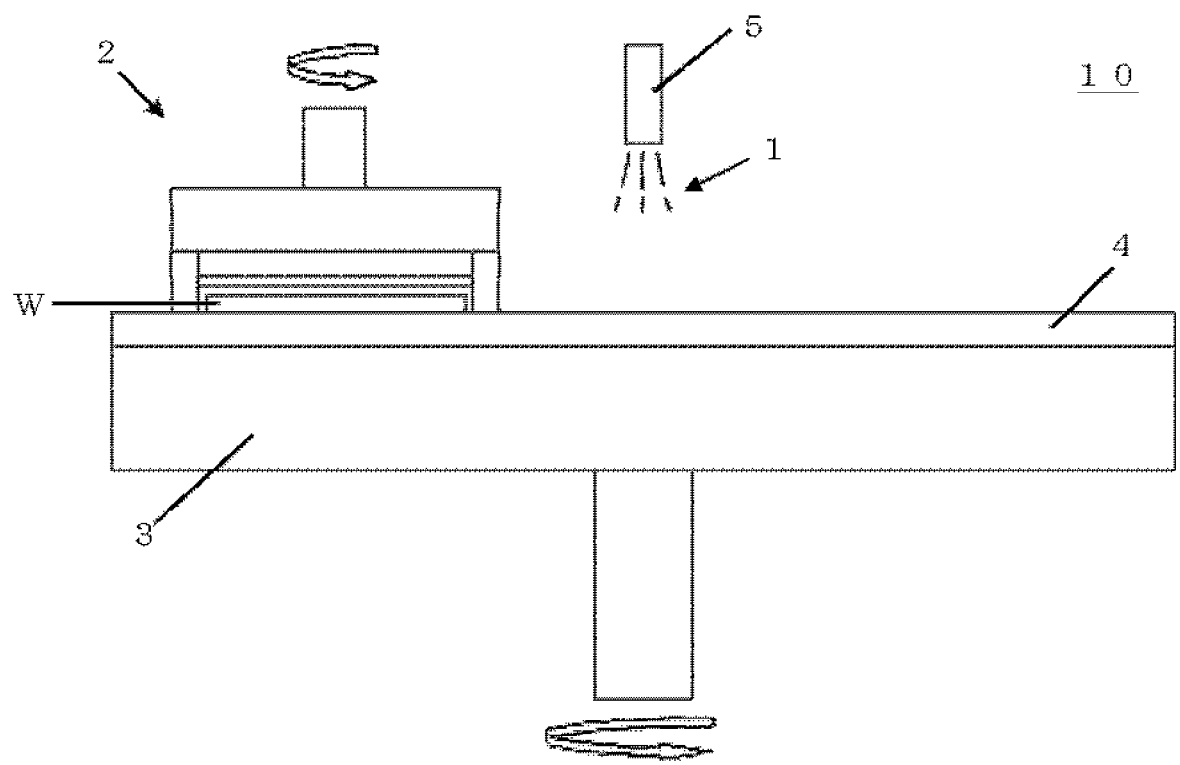

US 10,683,437 B2

POLISHING AGENT FOR SYNTHETIC QUARTZ GLASS SUBSTRATE AND METHOD FOR POLISHING SYNTHETIC QUARTZ GLASS SUBSTRATE

TECHNICAL FIELD

The present invention relates to a polishing agent used for polishing a synthetic quartz glass substrate. Moreover, the present invention also relates to a method for polishing a synthetic quartz glass substrate with the polishing agent.

BACKGROUND ART

In recent years, a synthetic quartz glass substrate used for semiconductor-related electronic materials for cutting-edge application is required to meet stringent standards for qualities such as defect density, defect size, surface roughness, and flatness, due to miniaturization of a pattern by photolithography. Above all, further quality is required for defects on the synthetic quartz glass substrate as integrated circuits become finer and magnetic media have higher capacity.

In view of this, a polishing agent used for polishing a synthetic quartz glass substrate is required to improve the quality of the synthetic quartz glass substrate after polishing. More specifically, it is strongly required that the polished synthetic quartz glass substrate has small surface roughness and that the polished synthetic quartz glass substrate has few surface defects such as a scratch on the surface. Furthermore, in view of productivity improvement, it is also required to improve the polishing rate of the synthetic quartz glass substrate.

Conventionally, in general, a polishing agent containing silica ($SiO_2$)-based abrasive grains has been investigated to be used as the polishing agent for a synthetic quartz glass substrate. Silica-based slurry is produced by subjecting silica particles to grain growth through thermal decomposition of silicon tetrachloride and adjusting pH with an alkaline solution containing no alkali metal such as ammonia.

For example, Patent Document 1 describes that defects can be reduced by using high-purity colloidal silica around neutrality. However, considering the isoelectric point of colloidal silica, colloidal silica is unstable around neutrality, and there is fear that the colloidal silica abrasive grains fluctuate in particle size distribution during polishing, and cannot be stably used. Thus, the silica-based polishing agent is difficult to be circulated and repeatedly used for polishing, and is necessarily disposed at one-time use, resulting in an economically unfavorable problem.

Moreover, Patent Document 2 describes that defects can be reduced by using a polishing agent containing an acid and colloidal silica having an average primary particle size of 60 nm or less. However, this polishing agent is insufficient to satisfy current requirements of reducing defects, and requires developing to reduce more defects.

On the other hand, ceria ($CeO_2$) particles, which have lower hardness than silica particles and alumina particles, are difficult to cause defects such as a scratch on the surface of the synthetic quartz glass substrate after polishing. Therefore, a polishing agent using the ceria particles as polishing abrasive grains is effective in reducing defects. Moreover, the ceria particles are known as a strongly oxidizing agent and have chemically active characteristics. Thus, the ceria-based polishing agent is effectively used for polishing an inorganic insulator such as glass.

However, the ceria-based polishing agent typically uses dry ceria particles. The dry ceria particles have irregular crystal shapes. Thus, when the dry ceria is used in a polishing agent, defects such as a scratch are easily generated on the surface of the synthetic quartz glass substrate. On the other hand, wet ceria particles have a more stable polyhedral structure than the dry ceria particles. This structure allows defects such as a scratch to be significantly improved, compared with the conventional dry ceria particles.

CITATION LIST

Patent Literature

Patent Document 1: Japanese Unexamined Patent publication (Kokai) No. 2004-98278
Patent Document 2: Japanese Unexamined Patent publication (Kokai) No. 2007-213020
Patent Document 3: Japanese Unexamined Patent publication (Kokai) No. 2006-167817

SUMMARY OF INVENTION

Technical Problem

However, when the wet ceria particles are used, the polishing rate cannot meet current requirements although defects such as a scratch are sufficiently reduced. Patent Document 3 describes that the polishing rate can be accelerated by using a polishing agent containing colloidal silica and a polymer having a sulfonic acid group such as an acrylic acid/sulfonic acid copolymer. However, the addition of such a polymer to the ceria-based polishing agent is still insufficient to achieve a currently required polishing rate, and the polishing rate requires further improvement. As mentioned above, the conventional techniques have difficulty in achieving both the reduction in polishing defects and the sufficient improvement in polishing rate.

The present invention was accomplished in view of the above-described problems. It is an object of the present invention to provide a polishing agent for a synthetic quartz glass substrate that has high polishing rate and can sufficiently reduce generation of defects due to polishing. Another object of the present invention is to provide a method for polishing a synthetic quartz glass substrate with high polishing rate while sufficiently reducing generation of defects.

Solution to Problem

To achieve this object, the present invention provides a polishing agent for a synthetic quartz glass substrate, comprising polishing abrasive grains, a polishing accelerator, and water, wherein the polishing abrasive grains are wet ceria particles, and the polishing accelerator is a polyphosphoric acid, a salt thereof, a metaphosphoric acid, a salt thereof, a tungstic acid, or a salt thereof.

The polishing agent for a synthetic quartz glass substrate of the present invention, which contains the wet ceria particles as the polishing abrasive grains, is difficult to cause defects such as a scratch on the surface of a synthetic quartz glass substrate in polishing using this polishing agent. Moreover, the use of any of the above compounds as the polishing accelerator enables sufficient polishing rate even when the wet ceria particles are used.

Additionally, the wet ceria particles are preferably contained in an amount of 5 parts by mass or more and 20 parts by mass or less per 100 parts by mass of the polishing agent for a synthetic quartz glass substrate.

When the concentration of the wet ceria particles is 5 parts by mass or more, favorable polishing rate can be ensured to the polishing agent for a synthetic quartz glass substrate. When the concentration of the wet ceria particles is 20 parts by mass or less, the storage stability of the polishing agent can be more increased.

Additionally, the polishing accelerator is preferably contained in an amount of 0.1 part by mass or more and 5 parts by mass or less per 100 parts by mass of the wet ceria particles.

In the present invention, when the polishing accelerator is contained in an amount of 0.1 part by mass or more per 100 parts by mass of the wet ceria particles, the effect of improving the polishing rate on the polishing agent for a synthetic quartz glass substrate can be sufficiently obtained. When the polishing accelerator is contained in an amount of 5 parts by mass or less, the storage stability of the polishing agent can be more increased.

Additionally, the polishing agent for a synthetic quartz glass substrate of the present invention preferably has pH of 3 or more and 8 or less.

When the polishing agent for a synthetic quartz glass substrate of the present invention has pH of 3 or more, the wet ceria particles in the polishing agent are stably dispersed. Moreover, when the pH is 8 or less, favorable polishing rate can be ensured to the polishing agent for a synthetic quartz glass substrate.

Furthermore, to achieve the above object, the present invention provides a method for polishing a synthetic quartz glass substrate, comprising using any of the above polishing agent for a synthetic quartz glass substrate in a finish polishing step after a rough polishing step.

The use of any of the above polishing agent for a synthetic quartz glass substrate of the present invention enables polishing at high polishing rate to produce a synthetic quartz glass substrate with few defects such as polishing damage. In particular, this method is preferably applied in a finish polishing step, which requires further reduction of defect generation.

Advantageous Effects of Invention

The present invention enables sufficient polishing rate and sufficient inhibition of defect generation on the surface of a synthetic quartz glass substrate when polishing the synthetic quartz glass substrate. As a result, productivity and yield can be improved to produce synthetic quartz glass substrates. In addition, especially when the polishing agent for a synthetic quartz glass substrate of the present invention is used in a finish polishing step in a process for producing a synthetic quartz glass substrate, finer semiconductor devices can be obtained.

BRIEF DESCRIPTION OF DRAWINGS

FIG. 1 is a schematic diagram showing a polishing apparatus that can be used for the method for polishing a synthetic quartz glass substrate of the present invention.

DESCRIPTION OF EMBODIMENTS

Hereinafter, embodiments of the present invention will be described, but the present invention is not limited thereto.

As mentioned above, the polishing agent for a synthetic quartz glass substrate (hereinafter, also simply referred to as a "polishing agent") of the present invention contains polishing abrasive grains, a polishing accelerator, and water. Additionally, the polishing agent of the present invention contains wet ceria particles as the polishing abrasive grains, and any of a polyphosphoric acid or a salt thereof, a metaphosphoric acid or a salt thereof, and a tungstic acid or a salt thereof as the polishing accelerator.

The wet ceria particles have lower hardness than silica particles or alumina particles, and have a more stable polyhedral structure than dry ceria particles. The polishing agent for a synthetic quartz glass substrate of the present invention, which contains such wet ceria particles as the polishing abrasive grains, can inhibit generation of defects such as a scratch due to polishing.

Moreover, containing the above polishing accelerator allows the polishing agent of the present invention to exhibit sufficiently high polishing rate even when the wet ceria particles are used as the polishing abrasive grains. A polyphosphoric acid or a salt thereof, a metaphosphoric acid or a salt thereof, and a tungstic acid or a salt thereof used as the polishing accelerator have slight reactivity to synthetic quartz glass. Thus, the reason why the polishing rate improves in the polishing agent for a synthetic glass substrate of the present invention is considered that a certain chemical reaction occurs between the polishing accelerator and the surface of the synthetic quartz glass substrate to modify the surface of the synthetic quartz glass substrate, promoting polishing.

Hereinafter, detailed explanation is given for the components in the polishing agent and components that can be optionally added to the polishing agent as well as for polishing a synthetic quartz glass substrate with the polishing agent of the present invention.

As mentioned above, the wet ceria particles contained in the polishing agent of the present invention have a polyhedral structure, compared with dry ceria particles and are favorable in that polishing damage such as a scratch can be improved. The average particle size of the wet ceria particles preferably ranges from 5 nm to 200 nm. Moreover, the average particle size of the wet ceria particles more preferably ranges from 20 nm to 100 nm, particularly preferably from 40 nm to 70 nm. When the average particle size of the wet ceria particles is 5 nm or more, the polishing rate of a synthetic quartz glass substrate can be sufficiently increased. Moreover, when the average particle size of the wet ceria particles is 200 nm or less, polishing damage such as a scratch can be more reduced. These effects are especially remarkable when the average particle size of the wet ceria particles ranges from 20 nm to 100 nm.

The average particle size of the wet ceria particles can be measured by, for example, an ultrasonic attenuation particle size analyzer (Zeta-APS, manufactured by Matec Applied Sciences Inc.).

The concentration of the wet ceria particles in the polishing agent is preferably, but not particularly limited to, 0.1 part by mass or more, more preferably 1 part by mass or more, particularly preferably 5 parts by mass or more per 100 parts by mass of the polishing agent in that favorable polishing rate of a synthetic quartz glass substrate can be more surely achieved. The upper limit of the concentration of the wet ceria particles is preferably 50 parts by mass or less, more preferably 30 parts by mass or less, particularly preferably 20 parts by mass or less, in view of increasing the storage stability of the polishing agent.

Moreover, in the present invention, the wet ceria particles are preferably produced by the following producing method. First, a cerium salt which is a precursor of ceria is mixed with ultrapure water to produce a cerium aqueous solution. The cerium salt and ultrapure water may be mixed at a ratio of 2:1 to 4:1, for example. As the cerium salt, at least one selected from Ce(III) salts and Ce(IV) salts may be used. Specifically, at least one Ce(III) salt may be mixed with ultrapure water, or at least one Ce(IV) salt may be mixed with ultrapure water, or at least one Ce(III) salt and at least one Ce(IV) salt may be mixed with ultrapure water. As the Ce(III) salt, cerium(III) chloride, cerium(III) fluoride, cerium(III) sulfate, cerium(III) nitrate, cerium(III) carbonate, cerium(III) perchlorate, cerium(III) bromide, cerium(III) sulfide, cerium(III) iodide, cerium(III) oxalate, cerium(III) acetate, and the like may be mixed. As the Ce(IV) salt, cerium(IV) sulfate, ammonium cerium(IV) nitrate, cerium (IV) hydroxide, and the like may be mixed. Among them, cerium(III) nitrate is preferable as the Ce (III) salt, and ammonium cerium(IV) nitrate as the Ce (IV) salt, in terms of ease of use.

Furthermore, an acidic solution may be mixed to stabilize the cerium aqueous solution produced by mixing with ultrapure water. The acidic solution and the cerium solution may be mixed at a ratio of 1:1 to 1:100. Examples of the usable acidic solution include hydrogen peroxide, nitric acid, acetic acid, hydrochloric acid, and sulfuric acid. The cerium solution mixed with the acidic solution may be adjusted to have pH of 0.01, for example.

In addition, a basic solution is produced separately from the cerium solution. For the basic solution, ammonia, sodium hydroxide, potassium hydroxide or the like may be used by diluting them with ultrapure water to an appropriate concentration. With respect to the dilution ratio, the basic substance may be diluted with ultrapure water at a ratio of 1:1 to 1:100. The diluted basic solution may be adjusted to have pH of 11 to 13, for example.

Then, the diluted basic solution is transferred to a reaction vessel and stirred for 5 hours under an inert gas atmosphere such as nitrogen, argon, or helium. Then, the cerium aqueous solution is mixed to the diluted basic solution at a rate of, for example, 0.1 L/sec or more. Subsequently, a heat treatment is performed at a predetermined temperature. The heat treatment temperature may be 100° C. or lower, for example, 60° C. or higher and 100° C. or lower; and the heat treatment time may be 2 hours or more, for example, 2 hours to 10 hours. Moreover, the heating rate from room temperature to the heat treatment temperature may be 0.2° C. to 1° C. per minute, preferably 0.5° C. per minute.

Subsequently, the mixed solution subjected to the heat treatment is cooled to room temperature. A mixed solution in which wet ceria particles having a primary particle size of 100 nm or less are generated is produced through such processes.

As described above, for the wet ceria particles, when a mixed solution of a precursor aqueous solution of a cerium salt and a diluted basic solution is heated at an appropriate heating rate and a heat treatment is performed at a temperature in an appropriate range, the cerium salt in the mixed solution reacts during the heating process, and fine nuclei of ceria ($CeO_2$) are generated. Then, crystal grows around the fine nuclei, whereby wet ceria crystal particles having a primary particle size of 5 nm to 100 nm are produced. Thus, the wet ceria particles produced by a wet precipitation method in which the cerium salt used as the precursor substance is mixed with the basic solution and subjected to a heat treatment have an appropriate primary particle size. Furthermore, such wet ceria particles do not easily generate particles having large secondary particle size. Therefore, a polishing agent containing such wet ceria particles having an appropriate particles size as the polishing abrasive grains can inhibit polishing damage more effectively.

Furthermore, the polishing agent for a synthetic quartz glass substrate of the present invention contains any of a polyphosphoric acid or a salt thereof, a metaphosphoric acid or a salt thereof, and a tungstic acid or a salt thereof as the polishing accelerator. Such polishing accelerators react with synthetic quartz glass and modify the surface of the synthetic quartz glass substrate during polishing to promote polishing, increasing the polishing rate. Examples of the polishing accelerator include polyphosphoric acid, sodium polyphosphate, ammonium polyphosphate, metaphosphoric acid, sodium metaphosphate, potassium metaphosphate, sodium hexametaphosphate, tungstic acid, phosphotungstic acid, sodium tungstate, ammonium tungstate, and calcium tungstate.

The polishing accelerator is preferably contained in an amount of 0.01 part by mass to 5 parts by mass per 100 parts by mass of the polishing agent. When the polishing accelerator is contained in an amount of 0.01 part by mass or more per 100 parts by mass of the polishing agent, the polishing accelerator sufficiently reacts with the surface of the synthetic quartz glass substrate and sufficiently improves the polishing rate. When the polishing accelerator is contained in an amount of 0.01 part by mass to 5 parts by mass per 100 parts by mass of the polishing agent, the chemical reaction with the surface of the synthetic quartz glass substrate is sufficient to provide high effect.

Additionally, in the polishing agent of the present invention, the polishing accelerator is preferably contained in an amount of 0.1 part by mass or more and 5 parts by mass or less per 100 parts by mass of the wet ceria particles. In the present invention, when the polishing accelerator is contained in an amount of 0.1 part by mass or more per 100 parts by mass of the wet ceria particles, the effect of improving the polishing rate on the polishing agent for a synthetic quartz glass substrate can be sufficiently obtained. When the polishing accelerator is contained in an amount of 5 parts by mass or less, the storage stability of the polishing agent can be more increased.

The polishing agent of the present invention may further contain other additives in addition to the above polishing accelerator to adjust polishing characteristics. Examples of such additives include amino acids and anionic surfactants that can change the surface potential of the wet ceria particles to negative. When the surface potential of the wet ceria particles is made negative, the particles can easily disperse in the polishing agent and do not easily generate secondary particles having large particle size, inhibiting polishing damage more effectively.

Examples of the anionic surfactants include monoalkyl sulfate, alkylpolyoxyethylene sulfate, alkylbenzene sulfonate, monoalkyl phosphate, lauryl sulfate, polycarboxylic acid, polyacrylate, and polymethacrylate. Examples of the amino acids include arginine, lysine, aspartic acid, glutamic acid, asparagine, glutamine, histidine, proline, tyrosine, serine, tryptophan, threonine, glycine, alanine, methionine, cysteine, phenylalanine, leucine, valine, and isoleucine.

These additives are preferably contained in an amount of 0.01 part by mass to 0.1 part by mass per 1 part by mass of the polishing abrasive grains. Furthermore, the additives are more preferably contained in an amount of 0.02 part by mass to 0.06 part by mass per 1 part by mass of the polishing abrasive grains in the polishing agent. When the content is 0.01 part by mass or more per 1 part by mass of the polishing abrasive grains, the wet ceria particles disperse in the polishing agent more stably and do not easily generate aggregated particles having large particle size. When the content is 0.1 part by mass or less per 1 part by mass of the polishing abrasive grains, the polishing agent does not impede polishing, and the reduction in the polishing rate can be prevented. Therefore, the additives contained in the above range can further improve the dispersion stability of the polishing agent while preventing the reduction in the polishing rate.

The pH of the polishing agent of the present invention is preferably in the range of 3.0 or more and 8.0 or less, in view of excellent storage stability and polishing rate. When the pH is 3.0 or more, the wet ceria in the polishing agent stably disperses. When the pH is 8.0 or less, the polishing rate can be more improved. Moreover, the lower limit of preferable pH range is more preferably 4.0 or more, particularly preferably 6.0 or more. Moreover, the upper limit of preferable pH range is preferably 8.0 or less, more preferably 7.0 or less. The pH of the polishing agent can be adjusted by adding an inorganic acid such as hydrochloric acid, nitric acid, sulfuric acid, or phosphoric acid, an organic acid such as formic acid, acetic acid, citric acid, or oxalic acid, ammonia, sodium hydroxide, potassium hydroxide, tetramethylammonium hydroxide (TMAH) or the like.

Next, the method for polishing a synthetic quartz glass substrate with the polishing agent of the present invention will be explained. Since the polishing agent of the present invention is preferably used especially in a finish polishing step after a rough polishing step, the explanation is given in conjunction with the case of single-side polishing in the finish polishing step. However, of course, the present invention is not limited thereto, and the polishing agent of the present invention can also be used for rough polishing. Moreover, the polishing agent of the present invention can be used not only for single-side polishing, but also for double-side polishing.

A single-side polishing apparatus that can be used for the polishing method of the present invention can be, for example, a single-side polishing apparatus 10 that includes a turn table 3 attached to a polishing pad 4, a polishing agent supply mechanism 5 and a polishing head 2, as shown in FIG. 1.

Moreover, as shown in FIG. 1, the polishing head 2 can hold a synthetic quartz glass substrate W to be polished, and can rotate. Moreover, the turn table 3 also can rotate.

For the polishing pad 4, nonwoven fabric, foamed polyurethane, porous resins or the like can be used. Moreover, since the surface of the polishing pad 4 is preferably always covered with a polishing agent 1 during polishing, the polishing agent supply mechanism 5 is preferably provided with a pump or the like to supply the polishing agent 1 successively.

In such a single-side polishing apparatus 10, the synthetic quartz glass substrate W is held by the polishing head 2, and the polishing agent 1 of the present invention is supplied from the polishing agent supply mechanism 5 to the polishing pad 4. Then, the turn table 3 and the polishing head 2 are rotated respectively to bring the synthetic quartz glass substrate W into sliding contact with the polishing pad 4.

Such a polishing method using the polishing agent of the present invention can accelerate the polishing rate and inhibit generation of defects due to polishing. Moreover, the polishing method of the present invention can provide a synthetic quartz glass substrate having significantly fewer defects and thus is suitably used for finish polishing.

In particular, a synthetic quartz glass substrate subjected to finish polishing by the polishing method of the present invention can be used for semiconductor-related electronic materials, and can be suitably used for photomask, nanoimprinting, and magnetic devices. In addition, a synthetic quartz glass substrate before finish polishing can be prepared, for example, by the following procedure. First, a synthetic quartz glass ingot is formed, and then the synthetic quartz glass ingot is annealed. Secondly, the synthetic quartz glass ingot is sliced into wafers, and the sliced wafers are chamfered and then lapped. Subsequently, the surface of each wafer is polished to a mirror finish. The synthetic quartz glass substrate thus prepared can be subjected to finish polishing by the polishing method of the present invention.

EXAMPLES

Hereinafter, the present invention will be more specifically described with reference to examples and comparative examples, but the present invention is not limited thereto.

First, wet ceria used as the polishing abrasive grains in Examples 1 to 3 described later was synthesized by the following procedure.
(Synthesis of Wet Ceria)

First, a solution in which 1000 g of cerium nitrate hexahydride ($Ce(NO_3)_3 \cdot 6H_2O$) has been dissolved in 250 g of pure water was mixed with 100 g of nitric acid to obtain a cerium(III) solution. Then, 1 g of diammonium cerium nitrate (($NH_4)_2Ce(NO_3)_3$) was dissolved in 500 g of pure water to obtain a cerium(IV) solution. Subsequently, the cerium(III) solution and the cerium(IV) solution were mixed to obtain a cerium mixed solution.

Subsequently, 4000 g of pure water was added dropwise into a reaction vessel under a nitrogen gas atmosphere, and 1000 g of ammonia water was added dropwise into the reaction vessel and stirred to obtain a basic solution.

Then, the cerium mixed solution obtained above was added dropwise to the reaction vessel containing the basic solution, stirred, and heated to 80° C. under a nitrogen gas atmosphere. Then, a heat treatment was performed for 8 hours to obtain a mixed solution containing wet ceria particles.

Subsequently, the mixed solution containing wet ceria particles was cooled to room temperature, and nitric acid was added dropwise to the mixed solution such that the mixed solution was adjusted to an acidity of pH 4 or less to terminate the reaction. After ceria particles in the mixed solution were precipitated, cleaning with pure water and centrifugation were repeated several times to obtain wet ceria particles to be finally used as the polishing abrasive grains.

Example 1

First, 500 g of the wet ceria particles synthesized above was mixed with 5 g of sodium polyphosphate (available from Wako Pure Chemical Industries, Ltd.) and 5000 g of pure water and ultrasonically dispersed for 60 minutes under stirring. Thereafter, the mixed solution was filtered through a filter having 0.5-μm holes and diluted with pure water to prepare a polishing agent for a synthetic quartz glass substrate containing 10 mass % wet ceria particles and 0.1 mass % sodium polyphosphate.

The obtained polishing agent for a synthetic quartz glass substrate had pH of 5.5. Moreover, when the particle size distribution was measured by an ultrasonic attenuation particle size analyzer (Zeta-APS, manufactured by Matec Applied Sciences Inc.), the average particle size was 0.10 μm (=100 nm).

Example 2

A polishing agent was prepared by the same procedure as in Example 1 except that sodium metaphosphate (available from KANTO Chemical Co., Inc.) was added instead of the sodium polyphosphate.

The obtained polishing agent had pH of 5.3. Moreover, when the particle size distribution was measured by the ultrasonic attenuation particle size analyzer as in Example 1, the average particle size was 0.11 μm (=110 nm).

Example 3

A polishing agent was prepared by the same procedure as in Example 1 except that sodium tungstate (available from Wako Pure Chemical Industries, Ltd.) was added instead of the sodium polyphosphate.

The obtained polishing agent had pH of 5.6. Moreover, when the particle size distribution was measured by the ultrasonic attenuation particle size analyzer as in Example 1, the average particle size was 0.10 μm (=100 nm).

Comparative Example 1

A polishing agent was prepared by the same procedure as in Example 1 except that no sodium polyphosphate was added.

The obtained polishing agent had pH of 5.8. Moreover, when the particle size distribution was measured by the ultrasonic attenuation particle size analyzer as in Example 1, the average particle size was 0.11 μm (=110 nm).

Comparative Example 2

A polishing agent was prepared by the same procedure as in Example 1 except that dry ceria particles were used as the polishing abrasive grains.

The obtained polishing agent had pH of 5.5. Moreover, when the particle size distribution was measured by the ultrasonic attenuation particle size analyzer as in Example 1, the average particle size was 0.15 μm (=150 nm).

Comparative Example 3

A polishing agent was prepared by the same procedure as in Example 1 except that dry ceria particles were used as the polishing abrasive grains and no sodium polyphosphate was added.

The obtained polishing agent had pH of 5.8. Moreover, when the particle size distribution was measured by the ultrasonic attenuation particle size analyzer as in Example 1, the average particle size was 0.15 μm (=150 nm).

With the respective polishing agents prepared in Examples 1 to 3 and Comparative Examples 1 to 3, synthetic quartz glass substrates were polished by a polishing apparatus as shown in FIG. 1. The polishing condition is as follows.

(Polishing Condition)

A polishing pad made of soft suede (manufactured by FILWEL Co., Ltd.) was attached to the turn table as the polishing pad. Then, a synthetic quartz glass substrate having a diameter of 4 inch (a diameter of about 100 mm) after rough polishing was set to the polishing head, and the substrate was polished. At this time, the polishing load was 60 gf/cm$^2$, the rotational speed of the turn table and the polishing head was 50 rpm, and the supply amount of the polishing agent was 100 ml per minute. Moreover, the polishing stock removal was 2 μm or more, which is enough to remove defects generated in the rough polishing step. Five synthetic quartz glass substrates were polished under this condition.

After polishing as described above, the synthetic quartz glass substrate was taken from the polishing head, washed with pure water, and subjected to ultrasonic cleaning. Thereafter, the synthetic quartz glass substrate was dried by a drier in 80° C. atmosphere. After drying, the change of thickness of the synthetic quartz glass substrate before and after polishing was measured by a reflection spectroscopic film thickness monitor (SF-3, manufactured by OTSUKA Electronics Co., Ltd.) to calculate the polishing rate. In addition, the number of defects having a size of 100 nm or more generated on the surface of the polished synthetic glass substrate was measured with a laser microscope. The result is given in Table 1. The table shows average values of the polishing rate and the number of defects in the five synthetic quartz glass substrates polished in Examples and Comparative Examples.

TABLE 1

| | Type of polishing abrasive grains | Type of polishing accelerator | Polishing rate (μm/hr) | Number of defects |
|---|---|---|---|---|
| Example 1 | wet ceria | sodium polyphosphate | 0.86 | 4 |
| Example 2 | wet ceria | sodium metaphosphate | 0.81 | 8 |
| Example 3 | wet ceria | sodium tungstate | 0.85 | 6 |
| Comparative Example 1 | wet ceria | none | 0.51 | 5 |
| Comparative Example 2 | dry ceria | sodium polyphosphate | 0.98 | 22 |
| Comparative Example 3 | dry ceria | none | 0.89 | 18 |

When the synthetic quartz glass substrates were polished with the polishing agents in Examples 1 to 3, i.e., the polishing agents using the wet ceria as the polishing abrasive grains and any of a polyphosphoric acid or a salt thereof, a metaphosphoric acid or a salt thereof, and a tungstic acid or a salt thereof as the polishing accelerator, generation of defects due to polishing could be inhibited. Furthermore, the polishing rate of the synthetic quartz glass substrates was as high as the case using the dry ceria particles.

On the other hand, Comparative Example 1 where the wet ceria particles were used without adding the polishing accelerator unlike Examples caused few defects, but showed a low polishing rate with respect to the synthetic quartz glass substrates.

Moreover, the polishing agent in Comparative Example 2 used the dry ceria particles as the polishing abrasive grains. In this case, the polishing rate was higher than Examples to some extent, but the number of defects generated on the surface of each synthetic quartz glass substrate after polishing was significantly higher than Examples.

Furthermore, Comparative Example 3 where the dry ceria was used as the polishing abrasive grains without adding the polishing accelerator showed a polishing rate equivalent to Examples, but the number of defects generated on the surface of each synthetic quartz glass substrate after polishing was significantly higher than Examples.

As described above, when a synthetic quartz glass substrate is polished with the polishing agent for a synthetic quartz glass substrate of the present invention, high polishing rate can be obtained to the synthetic quartz glass substrate, and generation of defects due to polishing can be inhibited.

It is to be noted that the present invention is not limited to the foregoing embodiment. The embodiment is just an exemplification, and any examples that have substantially the same feature and demonstrate the same functions and effects as those in the technical concept described in claims of the present invention are included in the technical scope of the present invention.

The invention claimed is:

1. A polishing agent for a synthetic quartz glass substrate, comprising polishing abrasive grains, a polishing accelerator, and water, wherein
the polishing abrasive grains are wet ceria particles,
the polishing accelerator is a tungstic acid, or a salt thereof, and
the polishing accelerator is present in an amount of 0.1 part by mass or more and 5 parts by mass or less per 100 parts by mass of the wet ceria particles.

2. The polishing agent for a synthetic quartz glass substrate according to claim 1, wherein the wet ceria particles are in an amount of 5 parts by mass or more and 20 parts by mass or less per 100 parts by mass of the polishing agent.

3. The polishing agent for a synthetic quartz glass substrate according to claim 1, wherein the polishing agent has pH of 3 or more and 8 or less.

4. The polishing agent for a synthetic quartz glass substrate according to claim 2, wherein the polishing agent has pH of 3 or more and 8 or less.

5. A method for polishing a synthetic quartz glass substrate, comprising using the polishing agent for a synthetic quartz glass substrate according to claim 1 in a finish polishing step after a rough polishing step.

6. A method for polishing a synthetic quartz glass substrate, comprising using the polishing agent for a synthetic quartz glass substrate according to claim 2 in a finish polishing step after a rough polishing step.

7. A method for polishing a synthetic quartz glass substrate, comprising using the polishing agent for a synthetic quartz glass substrate according to claim 3 in a finish polishing step after a rough polishing step.

8. A method for polishing a synthetic quartz glass substrate, comprising using the polishing agent for a synthetic quartz glass substrate according to claim 4 in a finish polishing step after a rough polishing step.

9. The polishing agent for a synthetic quartz glass substrate according to claim 3, wherein the polishing accelerator is at least one selected from the group consisting of sodium tungstate, ammonium tungstate, and calcium tungstate.

10. The polishing agent for a synthetic quartz glass substrate according to claim 4, wherein the polishing accelerator is at least one selected from the group consisting of sodium tungstate, ammonium tungstate, and calcium tungstate.

11. A method for polishing a synthetic quartz glass substrate, comprising using the polishing agent for a synthetic quartz glass substrate according to claim 10 in a finish polishing step after a rough polishing step.

12. A method for polishing a synthetic quartz glass substrate, comprising using the polishing agent for a synthetic quartz glass substrate according to claim 9 in a finish polishing step after a rough polishing step.

13. The polishing agent for a synthetic quartz glass substrate according to claim 9, wherein the polishing accelerator is sodium tungstate.

14. The polishing agent for a synthetic quartz glass substrate according to claim 1, wherein the polishing accelerator is present in an amount of 1 part by mass or more and 5 parts by mass or less per 100 parts by mass of the wet ceria particles.

* * * * *